United States Patent
With

(10) Patent No.: US 11,927,679 B2
(45) Date of Patent: Mar. 12, 2024

(54) METHOD FOR SYNCHRONIZING AN ENCODED SIGNAL, RECEIVER, COMPUTER PROGRAM PRODUCT AND NON-VOLATILE STORAGE MEDIUM

(71) Applicant: u-blox AG, Thalwil (CH)

(72) Inventor: Oliver With, Thalwil (CH)

(73) Assignee: u-blox AG, Thalwil (CH)

( * ) Notice: Subject to any disclaimer, the term of this patent is extended or adjusted under 35 U.S.C. 154(b) by 142 days.

(21) Appl. No.: 17/668,530

(22) Filed: Feb. 10, 2022

(65) Prior Publication Data
US 2022/0276392 A1    Sep. 1, 2022

(30) Foreign Application Priority Data
Feb. 12, 2021    (EP) ..................... 21156832

(51) Int. Cl.
*H04B 1/00*    (2006.01)
*G01S 19/24*    (2010.01)
*G01S 19/25*    (2010.01)

(52) U.S. Cl.
CPC ............ *G01S 19/243* (2013.01); *G01S 19/25* (2013.01)

(58) Field of Classification Search
CPC ............................... G01S 19/243; G01S 19/25
USPC ................... 375/147, 219, 295, 319
See application file for complete search history.

(56) References Cited

U.S. PATENT DOCUMENTS

| | | | |
|---|---|---|---|
| 10,574,437 B1* | 2/2020 | Ye | H04L 1/0045 |
| 10,785,074 B1* | 9/2020 | Wang | H04L 27/0014 |
| 2003/0021247 A1 | 1/2003 | Sendonaris | |
| 2009/0309791 A1 | 12/2009 | Chen | |
| 2011/0216811 A1 | 9/2011 | Rowitch | |
| 2019/0207743 A1* | 7/2019 | Chu | H04L 27/14 |

* cited by examiner

*Primary Examiner* — Zewdu A Kassa
(74) *Attorney, Agent, or Firm* — Fish & Richardson P.C.

(57) ABSTRACT

The present disclosure relates to a method for synchronizing an encoded signal, in particular a GNSS signal. The method comprises receiving an input signal comprising a first signal component and a second signal component, wherein a sequence of N bits of the first signal component and a sequence of M bits of the second signal component are known a priori. The method further comprises determining a first logical sequence based on a plurality of cross-product operations formed between pairs of vectors obtained from a plurality of received symbols of the first signal component and the second signal component of the received input signal. The method also comprises identifying a position of a second logical sequence within the first logical sequence, the second logical sequence resulting from logical operations performed between at least a part of the known sequence of N bits of the first signal component and a corresponding number of bits of the known sequence of M bits of the second signal component in order to synchronize to a frame of the received input signal.

14 Claims, 3 Drawing Sheets

METHOD FOR SYNCHRONIZING AN ENCODED SIGNAL, RECEIVER, COMPUTER PROGRAM PRODUCT AND NON-VOLATILE STORAGE MEDIUM

CROSS-REFERENCE TO RELATED APPLICATIONS

This application claims priority to European Application No. EP 21156832.4, filed on Feb. 12, 2021, the contents of which are hereby incorporated by reference herein in their entirety.

TECHNICAL FIELD

This disclosure relates to a method for synchronizing an encoded signal, in particular a Global Navigation Satellite System, GNSS, signal. The disclosure further relates to a receiver comprising a receiving unit and a processing unit. The disclosure also relates to a computer program product and a non-volatile storage medium.

BACKGROUND ART

Signals in wireless communication may comprise multiple components. For example, such a signal may comprise a first signal component and a second signal component that are organized in frames. In the case of GNSS communication, for example, the first and second signal components may be called a "data component" and a "pilot component". In addition to the data component carrying the navigation message, GNSS satellites may further transmit a pilot component to enhance weak signal tracking.

Although the formats of the first signal component and the second signal component may be different from each other, those components are aligned in time. To decode the data carried in one of those components, it is necessary to determine the phase of the leading edge of each frame, that is, to determine the boundary of the frame and synchronize a receiver to the received signal.

In accordance with some implementations, the present disclosure describes, among other things, a method, a receiver, a computer program product and a non-volatile storage medium, in which a reliable synchronization of a receiver to such a received signal is provided.

SUMMARY OF INVENTION

Various embodiments are recited by the independent claims. Further embodiments are disclosed in the attached dependent claims.

According to a first aspect of the invention, a method for synchronizing an encoded signal comprises the steps:
  receiving an input signal comprising a first signal component and a second signal component, wherein a sequence of N bits of the first signal component and a sequence of M bits of the second signal component are known a priori;
  determining a first logical sequence based on a plurality of cross-product operations formed between pairs of vectors obtained from a plurality of received symbols of the first signal component and the second signal component of the received input signal; and
  identifying a position of a second logical sequence within the first logical sequence, the second logical sequence resulting from logical operations performed between at least a part of the known sequence of N bits of the first signal component and a corresponding number of bits of the known sequence of M bits of the second signal component in order to synchronize to a frame of the received input signal.

An advantage of the method, in some implementations, according to the first aspect is that a robust and effortless synchronization of a receiver to a frame of a received input signal is provided. With this method, a phase locked loop tracking of the received input signal for synchronization is not necessary and frequency locked loop tracking of the signal can be sufficient. In other words, the method according to the first aspect allows a robust synchronization independent of a phase shift of the received signal in the I-Q plane of the receiver. Moreover, the method provides a simple synchronization process that merely relies on in-phase and quadrature information per received symbol. Additionally, a false alarm rate of this method, i.e., a faulty synchronization due to a random symbol sequence matching the expected synchronization sequence is lowered, e.g. halved, compared to conventional synchronization procedures, which depend on a check of two hypotheses and require knowledge whether the signal is tracked at 0 or 180 degrees, which is not necessary with the proposed method.

The encoded signal in this case may be, for example, a GNSS signal. In the following parts of the description, the concept of the invention is mainly described with respect to such GNSS signals for an easier understanding. However, this concept can equally be applied to any other kind of signaling, wherein a received signal comprises a corresponding first and second signal component, and for which a receiver shall be synchronized to such received signal.

The first signal component may be a data component, the second signal component may be a "dataless" component, e.g. a pilot component. In the case of a GNSS signal, the data component carries the navigation messages in a form of unknown data. The pilot component, i.e., the content of the pilot component, is known and deterministic. This content is called secondary code or overlay code. The data component and pilot component are respectively modulated with unique ranging codes which are specific to the space vehicle. Moreover, the data component is modulated with a stream of navigation data. The pilot component is modulated by a periodic secondary code sequence.

The first and the second signal component each consist of a sequence of bits, wherein each bit comprises a logical value. For each signal component, a certain amount of those bits is known a priori, i.e., the logical value of each of those known bits is known to the receiver.

According to the first aspect, a sequence of N bits of the first signal component is known, which may be, for example, a preamble, e.g. a sequence of bits that relates to an identification code of a transmitter, from which the received signal is transmitted, wherein the receiver has knowledge of said identification code. The sequence of N bits of the first signal component may be, for example, only a short sequence of said component with respect to an entire frame of said component, wherein a remaining sequence of bits of said component is unknown and comprises, for example, data being transmitted from the transmitter.

Further according to the first aspect, a sequence of M bits of the second signal component is known, which may be, for example, a secondary code, which is used to encode the signal between the transmitter and the receiver. For example, an entire bit sequence of the second signal component of a frame of said received signal may be known to the receiver.

The bits of the first signal component and the second signal component preferably are aligned in time. In other words, the bits of the first signal component and the second signal component have a fixed relationship in time with respect to each other. The same applies to frames of the first and the second signal component, which are also aligned in time.

Furthermore, a bit-wise synchronization of the receiver to the received signal, i.e., an alignment of a local replica of a primary code with the received input signal, is performed after the receiving of the input signal and before the determining of the first logical sequence, such that the receiver has knowledge of a location and duration of bits in time. This determination may be related, for example, to a wipe-off of a primary code of the received signal.

The first signal component and the second signal component are each transmitted from a transmitter, wherein the transmitter encodes those signal components with a phase shift of 90 degrees with respect to each other. The phase relationship between the first signal component and the second signal component is fixed. In other words, the first signal component and the second signal component are encoded orthogonally with respect to each other. Due to issues related with the transmission, propagation and/or reception of the signal, however, this orthogonality may be disturbed.

An advantage of the method according to the first aspect is, however, that a synchronization of a receiver to the received input signal may be performed, even if the first component and second component are received with a phase shift different from 90 degrees, e.g. 80 degrees to 100 degrees. Such a disturbance of the phase shift at the receiver's end does not interfere with the method for synchronization presented herein.

The bits encoded in the first signal component and in the second signal component are processed by the receiver, after the corresponding encoded signal is received, as measurements. Such measurement is a correlator output of the received signal, integrated over one symbol, in this case 10 ms. Those symbols are referred to as "received symbols" in this application, since the symbols carry the information of the received signal. Each symbol, therefore, comprises a corresponding measurement of the received signal. The measurements are aligned to the symbols, whose location in time is determined via the primary code. The measurements correspond to complex numbers in an in-phase (I)—quadrature (Q) plane of the receiver. Those complex numbers are interpreted as vectors. There are separate such measurements for the first and the second signal component. Those vectors are the above-mentioned vectors obtained from the plurality of received symbols. Each symbol, therefore, comprises the information of one bit.

The bits of the first and the second signal component describe the logical information, in a logical domain, that is modulated onto the encoded signal by the transmitter. The symbols of the first and the second signal component correspond to the above-mentioned bits, but describes the information, in the physical domain, which is received by the receiver. Those symbols comprise the logical information of the bits.

The first logical sequence is determined based on a plurality of cross-product operations formed between pairs of the above-mentioned obtained vectors. In other words, a cross-product is calculated between a vector obtained from a received symbol of the first signal component and a vector obtained from a corresponding received symbol of the second signal component. A correspondence between the symbols of the first and second signal component may be, for example, that cross-product operations are performed with respect to symbols that are received at the same time.

This calculation of the cross-products is performed, for example, consecutively for each received symbols, i.e., their corresponding vectors, of the first and the second signal component. By forming the cross-products between the above-mentioned vectors, a sequence of cross-product results is obtained, which may then be interpreted as logical values, to conclude the cross-product operations and determine the first logical sequence.

Since the values in the I-Q plane of the received symbols are defined as vectors, forming the cross-products between corresponding vectors delivers a resulting vector with either a positive or negative value, i.e., "up" or "down". The vectors that correspond to the received symbols of the first and the second signal component each have an x- and a y-value but no z-value or a zero z-value, wherein x corresponds to the I-axis and y to the Q-axis in the I-Q plane. The result of the cross-product of the two vectors produces a third vector. This third vector is perpendicular to the plane containing the two vectors and points away from the plane. Thus, the third vector can point in one of two directions: either "up" (i.e., a positive result of the cross-product) or "down" (i.e., a negative result of the cross-product).

Since the first signal component and the second signal component, and correspondingly their vectors, in the I-Q plane are coplanar, the result of said cross-product is a vector with just one value (in z-direction).

A length of those I-Q plane vectors, which corresponds to a signal strength of the received input signal, may be neglected in this case. It is possible to only consider the direction of the resulting vector ("up" or "down"), which does not depend on the length of the I-Q plane vectors. The first and the second signal component may have different power levels, which results in such different lengths of the corresponding vectors. Since the length of the vectors is not considered, the method proposed herein is not affected by such varying vector lengths. The vector length may even vary between bits or during bits, which may be caused by fluctuations in the power level due to a positioning of the receiver and different influences on the received power. The cross-product operation, therefore, further comprises a step of determining, for each cross product result, whether the result is to be interpreted as "up" or "down". For example, it may be interpreted that a cross-product result with a value greater or equal to 0 is interpreted as an "up" and a result with a value smaller than 0 is interpreted as a "down".

Once the sequence of results with respective "up" or "down" interpretations is obtained, the first logical sequence may be determined from those results. For example, an "up" is interpreted as a logical value 0, and a "down" is interpreted as a logical value 1. For each result of the plurality of cross-product operations, one respective logical value 0 or 1 may be allocated.

This first logical sequence is compared to a second logical sequence. The second logical sequence is obtained from logical operations performed between at least a part of the known sequence of N bits of the first signal component and a corresponding number of bits of the known sequence of M bits of the second signal component.

As described above, the sequence of N bits of the first signal component and the sequence of M bits of the second signal component are known a priori. Accordingly, also the second logical sequence may be known a priori. For example, the second logical sequence may be determined by the receiver itself or by another device and provided to the receiver. The logical operations are operations performed between logical values, and the logical operations correspond to the above-described cross-product operations of the obtained vectors.

For example, the logical operations may be a bit-wise exclusive-OR operation of respective logical values of those bits. Results of those logical operations are logical values, which can be compared to the logical values of the first logical sequence.

If, during comparing the first logical sequence and the second logical sequence, a match in their values can be found, the receiver has found the sequence of N known bits of the first signal component. In case the values of the first logical sequence and the second logical sequence match, the receiver has determined the location of the sequence of N known bits in the received input signal. Thereby, the receiver can determine also the starting point of the sequence of N known bits in the received input signal. From said match, a corresponding known location, in a time domain of the received input signal, can be determined.

For example, if it is known a priori that the known sequence of N bits of the first signal component corresponds to a beginning of a frame of the received signal, finding the first logical sequence in the received input signal corresponds to finding a beginning of a frame in the first input signal, thereby allowing the receiver to synchronize to the received input signal.

The cross-product operations between the pairs of vectors obtained from the received symbols of the first signal component and the second signal component of the received input signal may be performed for every symbol of the received input signal.

The identifying of the position of the second logical sequence within the first logical sequence may further be performed using a criterion that defines a maximum number of values by which the first logical sequence is allowed to differ from the second logical sequence.

This even further improves a reliability of the synchronization method, for example in case bit errors should occur in the received signal, or other problems may arise, that interfere with one or a few values on the determination of the first logical sequence. Using such a criterion for the identifying of the position of the second logical sequence within the first logical sequence can allow a successful synchronization, even if one or a few values between the values, which actually should match, of the first and second logical sequences differ.

The first logical sequence may be stored, after or during the first logical sequence is determined, for example by the receiver, and in the step of identifying the second logical sequence within the first logical sequence, the stored first logical sequence may be compared to the second logical sequence.

The first logical sequence may be stored, for example, in a memory unit of a microcontroller, a shift register, a ring buffer or any other storage unit. Storing the first logical sequence allows an easy, effortless and robust solution for comparing the first logical sequence with the second logical sequence.

Additionally or alternatively, also the second logical sequence may be stored, for example by the receiver. Since the second logical sequence remains the same as long as the signal, to which the receiver is to be synchronized, comprises the same known sequence of N symbols of the first signal component and the same known sequence of M symbols of the second signal component, the second logical sequence does not change. Storing the second logical sequence, thereby, allows the synchronization process with low computational effort.

The method according to the first aspect may be a computer-implemented method.

According to a second aspect of the invention, a receiver comprises a receiving unit and a processing unit, wherein the receiving unit is configured to receive an input signal comprising a first signal component and a second signal component, wherein a sequence of N bits of the first signal component and a sequence of M bits of the second signal component are known a priori. The processing unit is configured to determine a first logical sequence based on a plurality of cross-product operations formed between pairs of vectors obtained from a plurality of received symbols of the first signal component and the second signal component of the received input signal. The processing unit is further configured to identify a position of a second logical sequence within the first logical sequence, the second logical sequence resulting from logical operations performed between at least a part of the known sequence of N bits of the first signal component and a corresponding number of bits of the known sequence of M bits of the second signal component in order to synchronize to a frame of the received input signal.

According to a third aspect, a computer program product comprises instructions which, when executed by a computing device, cause the computing device to carry out the method according to the first aspect.

According to a fourth aspect, a non-volatile storage medium comprises a computer program product according to the third aspect.

Advantages and further embodiments of the second, third and fourth aspect correspond, in general, to those discussed above with respect to the first aspect.

Further embodiments and advantages are disclosed in the attached dependent claims, the figures and the description thereof. In the figures, the disclosure is presented with respect to a GNSS, to which the aspects of the disclosure may be applied. This example is chosen for a consistent and easily understandable presentation of the disclosure. The disclosure, however, is not limited in this regard.

DESCRIPTION OF EMBODIMENTS

Figure 1:
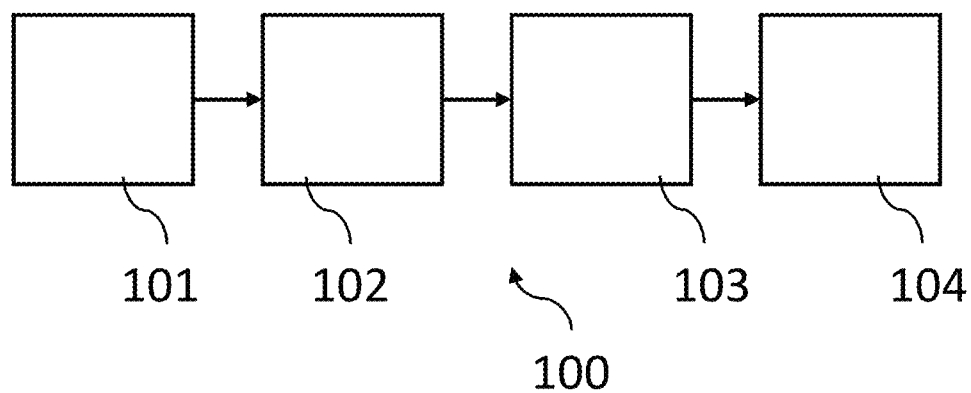
FIG. 1 shows a flowchart of a method for synchronizing a receiver with an encoded signal.

FIG. 1 shows a flowchart of a method 100 for synchronizing a receiver with an encoded signal according to an embodiment of the disclosure. The embodiment according to FIG. 1 is exemplarily described with respect to an encoded signal in a Global Navigation Satellite System (GNSS). In particular, a Beidou B1C system is chosen to present the disclosure. However, the disclosure is not limited to this example and may accordingly be applied to any other suitable communication system.

In a first step 101, an input signal is received by a receiver. The input signal in this case is a GNSS signal transmitted by a GNSS satellite and comprises a data component and a pilot component. The receiver may be any device that receives such GNSS signal, for example for locating or navigation purposes.

Figure 2:
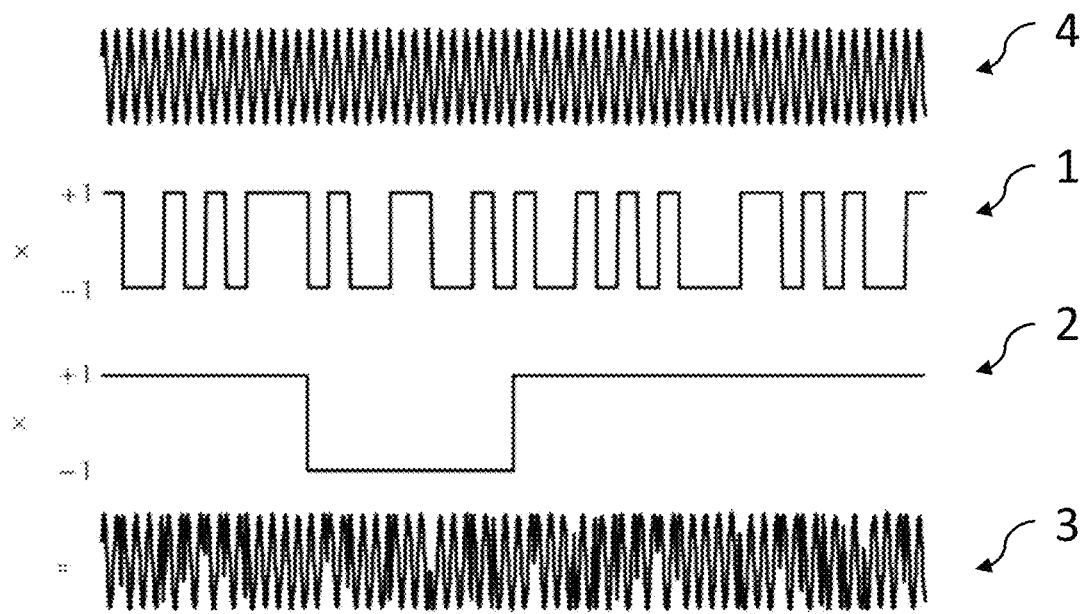
FIG. 2 shows a model of an encoded signal.

A model of the GNSS signal is shown in FIG. 2. FIG. 2 shows a spreading waveform 1 and data waveform 2 of the data component of the GNSS signal 3 in physical domain and how they are transmitted. The pilot component may look similar but is transmitted on a separate channel. The GNSS signal 3 consists of a radio frequency carrier 4, which determines a location of the signal in the frequency domain. The radio frequency carrier 4 is modulated by the spreading waveform 1, which has a chip length of 1 µs, and by the data waveform, which has a symbol length of 10 ms. The resulting signal is the GNSS signal 3, which is transmitted by the GNSS satellite.

After receiving the GNSS signal at step 101, the radio frequency carrier 4 and the spreading waveform 1 are wiped off by the receiver. The wipe-offs are performed for both, the data and the pilot component of the GNSS signal 3. Those wipe-offs may be performed according to methods known in the art and are not further described herein.

The pilot component and the data component of the GNSS signal are transmitted by the GNSS satellite with a phase shift of 90 degrees with respect to each other. The phase relationship between the data component and the pilot component is fixed. In other words, the data component and the pilot component are encoded, by the GNSS satellite, orthogonally with respect to each other. Due to issues related with the transmission of the signal, however, this orthogonality may be disturbed during transmission of the signal. The GNSS signal, when it is received by the receiver, therefore may have a phase shift between the pilot component and the data component between 80 degrees to 100 degrees. It is an advantage of the method described with respect to FIG. 1, however, that even with such disturbed phase shift between the components, a reliable synchronization may be performed.

Figure 3:
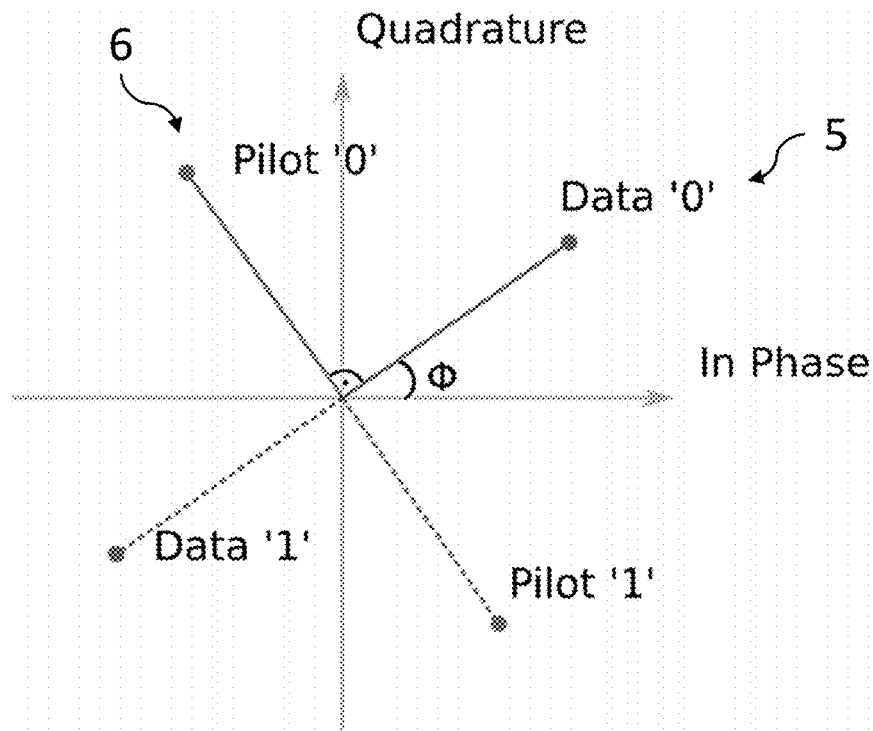
FIG. 3 shows a mapping of a data component and a pilot component in an I-Q plane.

A mapping of the data component and the pilot component is shown in FIG. 3. FIG. 3 shows an example of received symbols of the data component 5 and the pilot component 6 in an in-phase (I)—quadrature (Q) plane. The received symbols in this example are shifted by a phase shift φ with respect to the receiver's reference phase, which is symbolized by the coordinate system in FIG. 3. An advantage of the method described herein is, however, that this phase shift φ does not affect the synchronization of the receiver with the received GNSS signal.

The data component of the GNSS signal comprises a preamble, which in the case of the Beidou B1C signal, for example, is a sequence of N=21 bits. Those 21 bits of the preamble comprise an encoded pseudorandom noise, PRN, number of a satellite, which identifies the satellite that is tracked by the receiver and from which the GNSS signal is received. The 21 bits are known to the receiver. The remaining bits of a frame of the data component, which in total comprise a length of 1800 bits in the example of the Beidou B1C signal, relate to a navigation message transmitted by the satellite. Those remaining bits, of course, are unknown to the receiver.

The pilot component carries no data information and is used as reference signaling to enhance weak signal tracking. The pilot component carries in one frame a sequence of M=1800 bits, which comprises a secondary code, which is entirely known to the receiver. In other words, N=21 bits of the data component of a frame comprising in total 1800 bits and all M=1800 bits of the pilot component of such frame are known to the receiver. The data component and the pilot component are aligned in time. In other words, a beginning of a frame and a beginning of a symbol, which carries each bit, is aligned in time in the data and the pilot component.

Due to the fact that power values of the received signal components may be different, those measurements in the pilot or data component may have different values. The complex numbers of those measurements are interpreted as vectors in the I-Q plane, which accordingly have different lengths.

In a second step 102, a cross-product is formed between one such vector of the data component and one such vector of the pilot component. The cross-product is formed between vectors that correspond to symbols of each component that are received at a same time. In other words, the cross-product is formed between vectors that correspond to symbols of the data and the pilot component that are located in the same time domain of the received GNSS signal.

The vectors that correspond to the received symbols of the data and the pilot component each have an x- and a y- value but no z-value or a zero z-value, wherein x corresponds to the I-axis and y to the Q-axis in the I-Q plane, as shown in FIG. 3. The result of the cross-product of the two vectors produces a third vector. This third vector is normal to the plane containing the two vectors and points away from the plane. Thus, the third vector can point in one of two directions: either "up" (i.e., a positive result of the cross-product) or "down" (i.e., a negative result of the cross-product).

Since the data component and the pilot component, and correspondingly their vectors, in the I-Q plane are coplanar, the result of said cross-product is a vector with just one value (in z-direction).

Due to the above-mentioned different lengths of the vectors in the I-Q plane, the values of the resulting vectors of the cross-product, however, will in most cases not correspond to exactly +1 or −1, even though the phase between the data and the pilot component is locked to 90 degrees. The values of the vectors, however, may be neglected herein. If the value of the result of the cross-product is greater or equal to 0, i.e., the resulting vector points "up", a result of the cross-product is interpreted as a logical 0. If the result of the cross-product is smaller than 0, i.e., the resulting vector points "down", a result of the cross-product is interpreted as a logical 1. Another interpretation of the results, however, may of course be possible.

The step 102 is performed for each pair of received symbols of the data and the pilot component. By repeating the cross-product operation (including the interpreting of the results) for each pair of vectors of the received symbols, a first logical sequence is obtained.

Figure 4:
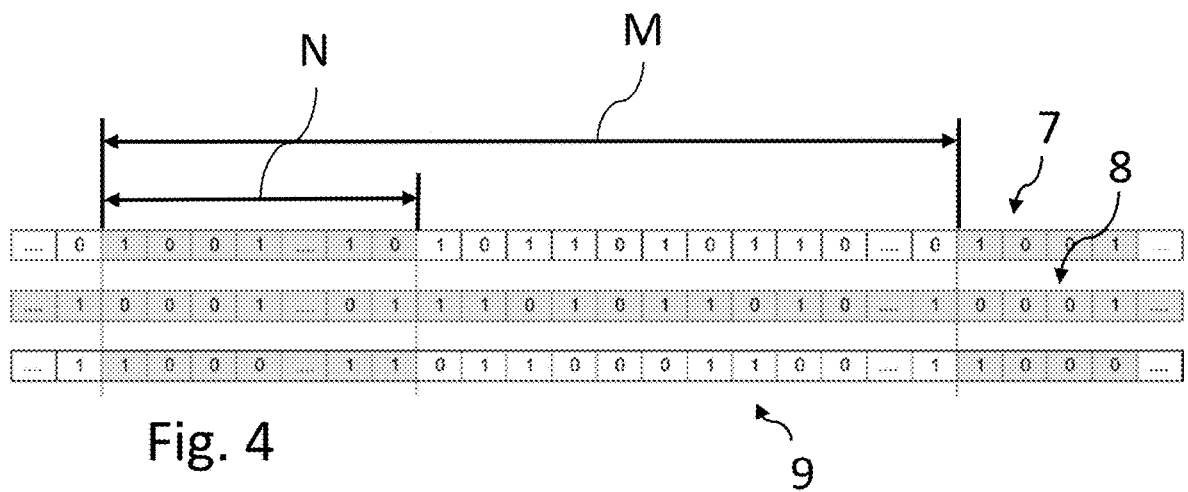
FIG. 4 shows sequences of bits of a data component and a pilot component and a logical sequence of a correlation thereof.

Such a first logical sequence is shown in FIG. 4, together with sequences of bits of a data component and a pilot component. FIG. 4 shows a first sequence of bits 7 of a data component and a second sequence of bits 8 of a pilot component. Moreover, FIG. 4 shows a first logical sequence 9, which is determined according to the cross-product operations described above.

Moreover, in FIG. 4, the N=21 known bits of the data component and the M=1800 known bits of the pilot component are visible. The M=1800 bits in this case also account for an entire frame of the received GNSS signal.

What is further evident from FIG. 4 is, that the data component and the pilot component are aligned in time. In other words, a beginning of a frame and a beginning of a symbol, which carries each bit, is aligned in time in the data and the pilot component.

A second logical sequence is obtained from logical operations performed between the known sequence of N bits of the data component and a corresponding (i.e., time equivalent) sequence of N bits of the M known bits of the pilot component. The logical operation is an operation that corresponds to the above-mentioned cross-product operation of the received symbols of the GNSS signal. "Corresponding" in this context means that if bits of the data component and the pilot component are equal to bits carried in the symbols of the received data component and pilot component, also the results of the cross-product operation formed between pairs of vectors obtained from said received symbols and the logical operations shall be equal or corresponding to each other.

In a third step 103, the first logical sequence, determined in second step 102, is compared to the second logical sequence, in order to identify a position of the second logical sequence in the first logical sequence. Thereby it is recognized, where in the first logical sequence (i.e., in an entire frame of the received GNSS signal) the second logical sequence can be identified.

In the example described herein, the logical operation performed between each corresponding pair of known bits is an exclusive-OR operation of the respective logical values of those bits. In case the logical values of corresponding bits are both 0 or both 1, a result of the logical operation is 0. If the logical values of corresponding bits are not equal, i.e., one is 1 and the other is 0, the result of the logical operation is 1. Thereby, the results of those logical operations correspond to the results of the cross-product operations. Due to the fact that in the example described herein 21 bits of the data component are known, the second logical sequence also comprises 21 values. Other logical operations in that regard are, of course, also possible. For example, the logical operation may also be an exclusive-NOR operation.

This logical operation is, in the present example, performed by the receiver once and the second logical sequence resulting therefrom is stored in a storage unit of the receiver. Alternatively, the second logical sequence may also be computed by the receiver on the fly, or may be computed by another device and then may be provided to the receiver.

If, in the first logical sequence, the second logical sequence can be identified, i.e., if a part of the first logical sequence can be found, in which the values of the first logical sequence matches the values of the second logical sequence, the receiver knows that a part of the received GNSS signal was found, in which the N known bits of the data component are located.

In the example described herein, the 21 known bits of the data component are the preamble, as discussed above. This preamble is located at a beginning of each frame. Accordingly, when the receiver knows where in the received signal the 21 known bits are, a beginning of the frame is determined.

In a fourth step 104, the receiver then synchronizes to the received GNSS signal based on the information obtained in steps 101 to 103.

In the third step 103, in which the second logical sequence is compared with the first logical sequence to identify the position of the second logical sequence within the first logical sequence, additionally a criterion that defines a maximum number of values by which the first logical sequence is allowed to differ from the second logical sequence can be used. In other words, it is not necessary, in order to identify the second logical sequence in the first logical sequence, that all logical values of the 21 values of the second logical sequence match with a corresponding part of the first logical sequence. For example, it may be determined that the second logical sequence has been found in the first logical sequence, in case that only 20, 19 or less values of the first and second logical sequences match.

This renders the method more reliable in case single values of the first logical sequence are wrong, for example due to an issue that may arise, when performing the cross-product operations, caused by a change of the phase φ by more than 90 degree, e.g. because of user dynamics, in the received signal. The above-mentioned criterion, however, may be chosen in such a way that the method for synchronizing the receiver is reliable even if such wrongly determined values in the first logical sequence occur, but at the same time, a risk of finding the second logical sequence in the first logical sequence by accident, i.e., in a part of the data component which differs from the preamble, is kept low.

Moreover, for the second logical sequence, a sequence of less than the 21 logical values corresponding to the 21 bits of the data component can be chosen. The shorter the second logical sequence is, the less storage space the second logical sequence may require and a processing power, in particular for the step of comparing the first and the second logical sequence, may be reduced. Also in this case, however, the length of the second logical sequence may be chosen in such a way that the risk of an accidental finding of the second logical sequence in the first logical sequence, as discussed above, is kept low.

The method as described with reference to FIG. 1 is a computer implemented method.

Figure 5:
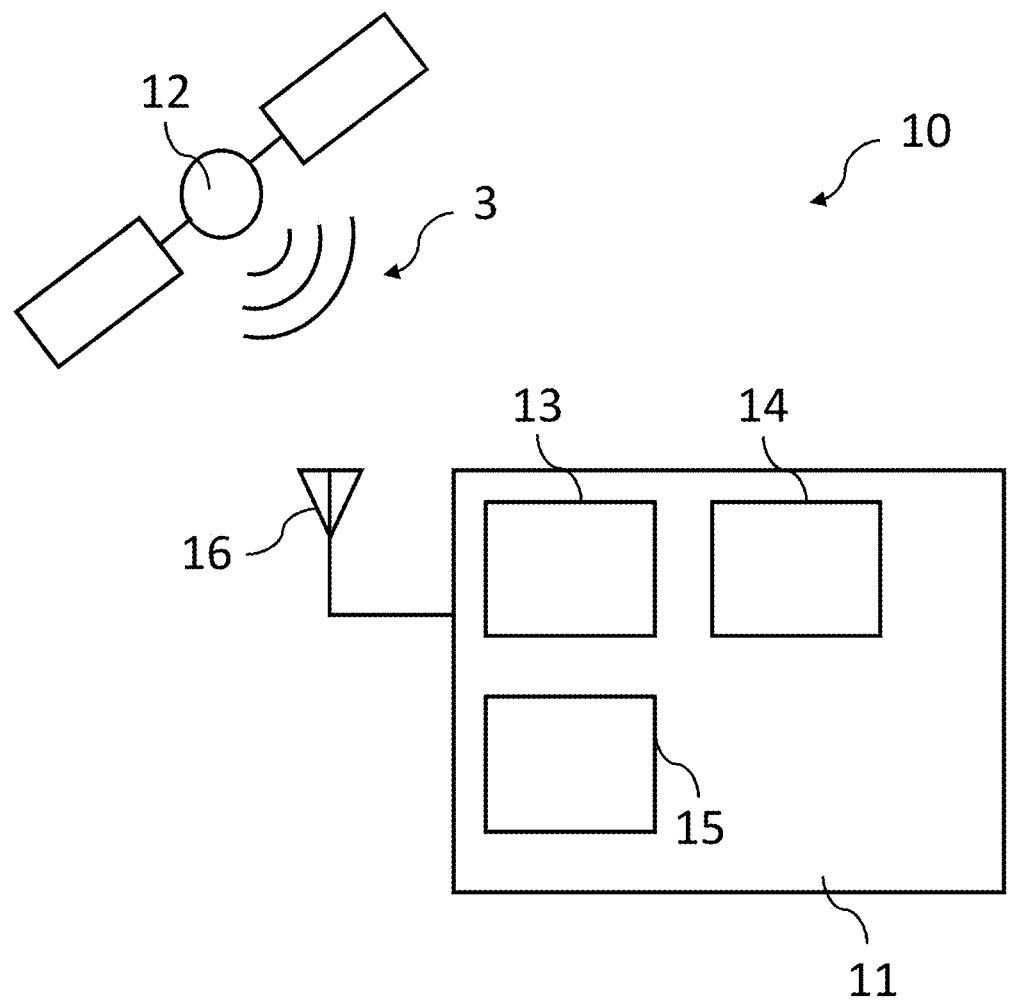
FIG. 5 shows a system comprising a receiver.

FIG. 5 shows a system 10 comprising a receiver 11 according to an embodiment of the disclosure. The receiver 11 may be, for example, the receiver which is discussed with respect to FIGS. 1 to 4, arranged to perform the method discussed with respect to FIG. 1.

The system 10 is, in this example, a GNSS, but can be, of course, also any other suitable communication system. The system 10 further comprises a satellite 12, which transmits a GNSS signal 3. Only one satellite 12 is shown to provide an easily understandable description. Multiple satellites, however, may of course be present. The GNSS signal 3 comprises a data component and a pilot component, not shown herein. Moreover, the GNSS signal 3 corresponds to the GNSS signal discussed in detail with respect to FIGS. 1 to 4. The description thereof is not repeated herein.

The receiver 11 comprises a receiving unit 13, a processing unit 14, a storage unit 15 and an antenna 16. The receiving unit 13 is configured to receive, via the antenna 16, the GNSS signal 3 comprising the data component and the pilot component. As discussed in detail with respect to FIGS. 1 to 4 and not repeated herein, a sequence of N bits of the data component and a sequence of M bits of the pilot component are known a priori to the receiver 11.

The processing unit 14 is configured to determine a first logical sequence based on a plurality of cross-product operations formed between pairs of vectors obtained from a plurality of received symbols of the data component and the pilot component of the received GNSS signal 3. The processing unit 14 is further configured to identify a position of a second logical sequence within the first logical sequence. This is also discussed in detail with respect to FIGS. 1 to 4 and not repeated herein.

The second logical sequence is a result from logical operations performed between at least a part of the known sequence of N bits of the data component and a corresponding number of bits of the known sequence of M bits of the pilot component.

The receiver 11 further comprises a storage unit 15. The processing unit 14 is further arranged to store the first logical sequence in the storage unit 15, and, to identify the position of the second logical sequence within the first logical sequence by comparing the stored logical sequence to the expected second logical sequence. Also the second logical sequence, which may be computed by the receiver 11 or received from another device, may be stored in the storage unit 15 or may be stored in another storage unit.

The receiver 11 is arranged to synchronize to a frame of the received GNSS signal 3 in case the second logical sequence has been identified in the first logical sequence. Further details thereof are described with respect to FIGS. 1 to 4 and are not repeated herein.

LIST OF REFERENCE SIGNS 100 method for synchronizing an encoded signal
101-104 steps
1 spreading waveform
2 data waveform
3 GNSS signal
4 radio frequency carrier
5 data component
6 pilot component
7 first sequence of bits of the data component
8 first sequence of bits of the pilot component
9 first logical sequence
10 system
11 receiver
12 satellite
13 receiving unit
14 processing unit
15 storage unit
16 antenna

The invention claimed is:

1. A method for synchronizing an encoded signal, the method comprising:
   receiving an input signal comprising a first signal component and a second signal component, wherein a sequence of N bits of the first signal component and a sequence of M bits of the second signal component are known a priori;
   determining a first logical sequence based on a plurality of cross-product operations formed between pairs of vectors obtained from a plurality of received symbols of the first signal component and the second signal component of the received input signal;
   determining a second logical sequence based on logical operations performed between at least a part of the known sequence of N bits of the first signal component and a corresponding number of bits of the known sequence of M bits of the second signal component, in order to synchronize to a frame of the received input signal; and
   identifying a position of the second logical sequence within the first logical sequence, the identified position reflecting a location of where the known sequence of N bits of the first signal component are identified in the received input signal.

2. The method according to claim 1, wherein the cross-product operations formed between the pairs of vectors obtained from the received symbols of the first signal component and the second signal component of the received input signal are performed for every symbol of the received input signal.

3. The method according to claim 1, wherein the second signal component and the first signal component of the received input signal are received 80 degrees to 100 degrees out of phase from each other.

4. The method according to claim 1, wherein the bits and/or frames of the first signal component and the second signal component are aligned in time.

5. The method according to claim 1, wherein determining the first logical sequence comprises allocating a respective logical value to each result of the plurality of cross-product operations.

6. The method according to claim 1, wherein the identifying the position of the second logical sequence within the first logical sequence is performed using a criterion that defines a maximum number of values by which the first logical sequence is allowed to differ from the second logical sequence.

7. The method according to claim 1, wherein, after or during the first logical sequence is determined, the first logical sequence is stored, and wherein in the step of identifying the position of the second logical sequence within the first logical sequence, the stored first logical sequence is compared to the second logical sequence.

8. The method according to claim 1, wherein the logical operations between the at least a part of the known sequence of N bits of the first signal component and a corresponding number of bits of the known sequence of M bits of the second signal component corresponds to a bit-wise exclusive-OR operation of respective logical values of those bits.

9. The method according to claim 1, wherein the received input signal is a global navigation satellite system (GNSS) signal that comprises a primary code and secondary code and, before the first logical sequence is determined, the primary code is wiped off.

10. The method according to claim 1, wherein the received input signal is a global navigation satellite system (GNSS) signal and the known sequence of N bits of the first signal component are a preamble of the first signal component and the second signal component consists of the known sequence of M bits of the second signal component comprising a secondary code.

11. The method according to claim 1, wherein the first signal component is a data component and the second signal component is a pilot component of the received input signal.

12. A receiver comprising a receiving unit and a processing unit, wherein
   the receiving unit is configured to:
      receive an input signal comprising a first signal component and a second signal component, wherein a sequence of N bits of the first signal component and a sequence of M bits of the second signal component are known a priori; and
   the processing unit is configured to:
      determine a first logical sequence based on a plurality of cross-product operations formed between pairs of vectors obtained from a plurality of received symbols of the first signal component and the second signal component of the received input signal; and
      determine a second logical sequence based on logical operations performed between at least a part of the known sequence of N bits of the first signal component and a corresponding number of bits of the known sequence of M bits of the second signal component, in order to synchronize to a frame of the received input signal; and identify a position of the second logical sequence within the first logical sequence, the identified position reflecting a location of where the known sequence of N bits of the first signal component are identified in the received input signal.

13. The receiver according to claim 12, further comprising a storage unit, wherein the processing unit is further configured to store the first logical sequence in the storage unit, and, to identify a position of the second logical sequence within the first logical sequence by comparing the stored first logical sequence to the second logical sequence.

14. One or more tangible, non-transitory, computer-readable media storing instructions that, when executed by one or more processors, cause the one or more processors to perform operations comprising:

receiving an input signal comprising a first signal component and a second signal component, wherein a sequence of N bits of the first signal component and a sequence of M bits of the second signal component are known a priori, the operations comprising:

determining a first logical sequence based on a plurality of cross-product operations formed between pairs of vectors obtained from a plurality of received symbols of the first signal component and the second signal component of the received input signal; and determining a second logical sequence based on logical operations performed between at least a part of the known sequence of N bits of the first signal component and a corresponding number of bits of the known sequence of M bits of the second signal component, in order to synchronize to a frame of the received input signal; and identifying a position of the second logical sequence within the first logical sequence, the identified position reflecting a location of where the known sequence of N bits of the first signal component are identified in the received input signal.

* * * * *